United States Patent
Endo et al.

(10) Patent No.: US 7,680,336 B2
(45) Date of Patent: *Mar. 16, 2010

(54) INFORMATION PROCESSING METHOD AND APPARATUS

(75) Inventors: Takaaki Endo, Urayasu (JP); Kiyohide Satoh, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 883 days.

This patent is subject to a terminal disclaimer.

(21) Appl. No.: 11/426,778

(22) Filed: Jun. 27, 2006

(65) Prior Publication Data

US 2007/0008340 A1 Jan. 11, 2007

(30) Foreign Application Priority Data

Jun. 28, 2005 (JP) .............................. 2005-188296

(51) Int. Cl.
  *G06K 9/66* (2006.01)
(52) U.S. Cl. ....................... 382/190; 345/419; 345/629; 382/106; 382/154; 702/92; 702/150
(58) Field of Classification Search ................. 345/419, 345/629, 633, 648; 382/106, 154, 190; 702/92, 702/150
  See application file for complete search history.

(56) References Cited

U.S. PATENT DOCUMENTS

| | | | |
|---|---|---|---|
| 6,204,852 B1 * | 3/2001 | Kumar et al. ................ | 345/419 |
| 6,837,432 B2 * | 1/2005 | Tsikos et al. ........... | 235/462.01 |
| 6,993,179 B1 * | 1/2006 | Weinshall et al. ........... | 382/154 |
| 7,164,800 B2 * | 1/2007 | Sun ............................. | 382/236 |
| 7,467,061 B2 * | 12/2008 | Satoh et al. .................. | 702/150 |
| 7,574,045 B2 * | 8/2009 | Simon et al. ................. | 382/181 |
| 2004/0176925 A1 | 9/2004 | Satoh | |
| 2007/0008340 A1 * | 1/2007 | Endo et al. .................. | 345/633 |

(Continued)

FOREIGN PATENT DOCUMENTS

JP       11-084307 A       3/1999

(Continued)

OTHER PUBLICATIONS

A. State, et al.,"Superior augmented reality registration by integrating landmark tracking and magnetic tracking," Proc. SIGGRAPH '96, pp. 429-438, Jul. 1996.

(Continued)

*Primary Examiner*—Gregory M Desire
(74) *Attorney, Agent, or Firm*—Canon U.S.A. Inc., I.P. Division

(57) ABSTRACT

An imaging apparatus index detecting unit detects an index in a physical space from an image captured by an imaging apparatus including a first camera. A position and orientation estimating unit estimates the position and orientation of the imaging apparatus based on information relating to image coordinates of a detected index. A second camera index candidate detecting unit monitors an index on the imaging apparatus with a second camera positioned in the physical space, and detects an index candidate. A position constraint condition calculating unit calculates a position constraint condition based on information relating to image coordinates of a detected index candidate. A second camera index identifying unit identifies a second camera index based on the estimated position and orientation of the imaging apparatus and the position constraint condition of the second camera index candidate.

17 Claims, 12 Drawing Sheets

U.S. PATENT DOCUMENTS

2008/0069405 A1* 3/2008 Endo et al. .................. 382/106

FOREIGN PATENT DOCUMENTS

JP    2000-041173 A    2/2000
JP    2004-233334 A    8/2004

OTHER PUBLICATIONS

Hirokazu Kato, et al., "An Augmented Reality System and its Calibration based on Marker Tracking ," The Virtual Reality Society of Japan, monograph, vol. 4, No. 4, pp. 607-616, Dec. 1999.

X. Zhang, et al., "Visual marker detection and decoding in AR systems": A comparative study, Proc. of International Symposium on Mixed and Augmented Reality (ISMAR'02), 2002.

R. M. Haralick, et al., "Review and analysis of solutions of the three point perspective pose estimation problem," International Journal of Computer Vision, vol. 13, No. 3, pp. 331-356, 1994.

D. G. Lowe, "Fitting parameterized three-dimensional models to images," IEEE Transactions on PAMI, vol. 13, No. 5, pp. 441-450, 1991.

Hirofumi Fujii, et al., "A Registration Method Using Stereo Cameras with and Inertial Sensor for Augmented Reality," The Institute of Electronics, Information, and Communication Engineers, Technical Report PRMU99-192 (Shingakugihou, vol. 99, No. 574, pp. 1-8), 2000.

H. Najafi, et al., "Automated Initialization for Marker-less Tracking: A Sensor Fusion Approach," Proc. of International Symposium on Mixed and Augmented Reality, pp. 79-88, 2004.

* cited by examiner

FIG.9
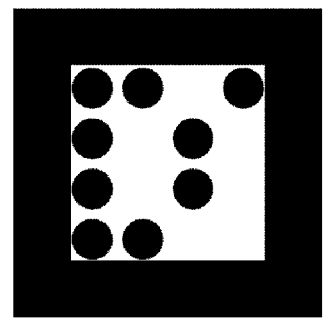
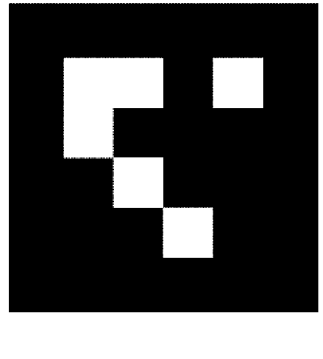

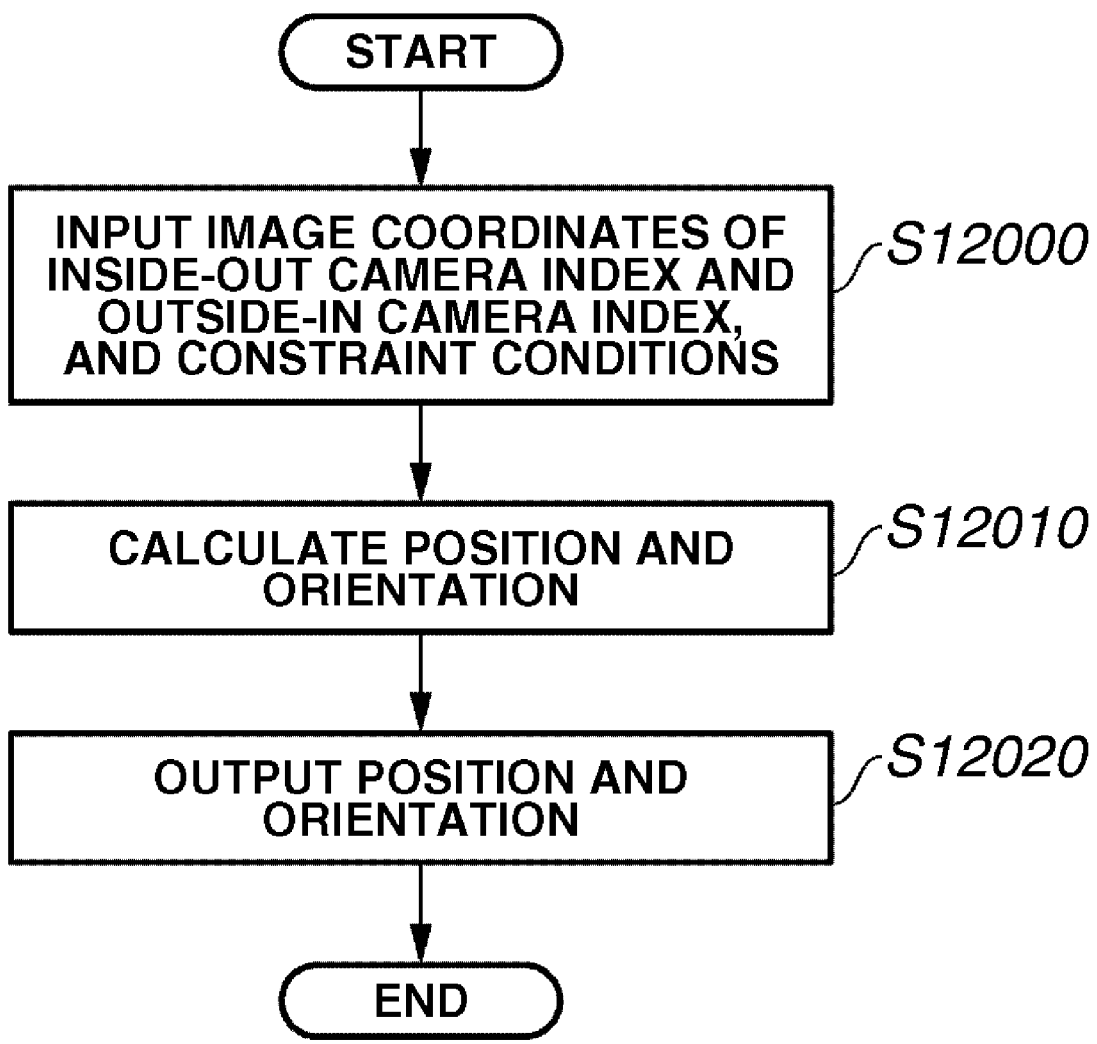

INFORMATION PROCESSING METHOD AND APPARATUS

BACKGROUND OF THE INVENTION

1. Field of the Invention

The present invention relates to an information processing technique applicable to a system required to identify an index contained in an image captured by an imaging apparatus.

2. Description of the Related Art

Conventional Technique 1

The position and orientation measurement of a camera or another capture unit capturing a physical space (hereinafter, collectively referred to as a "camera") is, for example, required in a mixed reality system that combines a physical space and a virtual space to display a combined space image.

As discussed in Japanese Patent Application Laid-Open No. 11-084307, Japanese Patent Application Laid-Open No. 2000-041173, or A. State, G. Hirota, D. T. Chen, B. Garrett, and M. Livingston: "Superior augmented reality registration by integrating landmark tracking and magnetic tracking," Proc. SIGGRAPH '96, pp. 429-438, July 1996, there is a conventional method for correcting measurement errors obtained by a sensor that can measure the position and orientation of a camera by using a marker or a feature point (hereinafter, collectively referred to as an "index") disposed at a known position in the physical space.

Conventional Technique 2

As discussed in Kato, Billinghurst, Asano, and Tachibana: "Marker tracking based augmented reality system and related calibration," The Virtual Reality Society of Japan, monograph, vol. 4, no. 4, pp. 607-616, December 1999, or X. Zhang, S. Fronz, and N. Navab: "Visual marker detection and decoding in AR systems": A comparative study, Proc. of International Symposium on Mixed and Augmented Reality (ISMAR'02), 2002, there is a conventional method for estimating the position and orientation of a camera based on only an index captured by the camera without relying on the information obtained from a position and orientation sensor.

For example, the position and orientation of a camera can be estimated based on coordinates of four vertices of a square if such a square index is used. However, the square is rotationally symmetric (in each rotation of 90°) about a rotation axis passing through the center (i.e., a crossing point of diagonal lines) and perpendicular to the square surface. Thus, it is impossible to identify the up-and-down or right-and-left direction based on the coordinates of respective vertices. To solve this problem, a square index can involve an image feature defining the directions. Furthermore, when plural indices are employed, it is necessary to discriminate each index based on only an image captured by a camera. Thus, an index can involve graphic information, such as a unique pattern or symbol, differentiated for each index.

Conventional Technique 3

Furthermore, there is a conventional method for estimating the position and orientation of an object body by using plural capture units each having a known position and orientation in a physical space and capturing images of plural indices each having a known position on the object body. According to this conventional technique, a light-emitting diode (LED) is used as a unit for identifying each detected index, and the light emission timing of each LED is controlled.

In the method for estimating the position and orientation of a camera according to the conventional technique 1, each index can be a small circular sheet having a specific color. In this case, the information of each index is three-dimensional position information (i.e., coordinates) and the color.

The method for identifying an index can include the steps of projecting a three-dimensional position of the index onto an image surface of a camera by utilizing measured values of a position and orientation sensor, detecting the color of the index from the image, and calculating a centroid position from the image. Furthermore, the method can include the steps of comparing the position of the index projected on the image surface with the centroid position calculated from the image, and identifying a closest one as a true index.

However, according to the above-described color region detection method for detecting an index from an image, a region or object similar to the index may be erroneously detected from a physical space captured by the camera, for example, when the color of the erroneously detected region is similar to the color of the index.

To solve the above-described problem, there is a conventional method using a combined index composed of different color patterns concentrically disposed, including the steps of detecting color regions, checking a combination of detected colors, and identifying a region having a correct color combination as a true index. According to this method, compared to a method using a monochrome index, the possibility of erroneously detecting part of the background image as an index can be lowered.

However, to accurately and stably detect an index based on the color region detection method, the color of each index must be easily and surely recognized. Furthermore, when an index is composed of different color patterns concentrically disposed, the index must be sufficiently large in a captured image so that the concentric color patterns can be surely detected. In other words, an excessively large index, which may spoil the physical space image, must be disposed in the physical space. However, disposing such an excessively large index in a limited physical space may not be allowed, or may deteriorate the visibility of the physical space.

According to the method utilizing a square marker or another graphic index as described in the conventional technique 2, discrimination of each marker is completely dependent on the limited information obtainable from an image. Thus, each index must involve distinctive symbol information or template information.

FIG. 9 shows examples of a practical square marker used in the above-described conventional technique 2, which is discussed in Kato, Billinghurst, Asano, and Tachibana: "Marker tracking based augmented reality system and related calibration," The Virtual Reality Society of Japan, monograph, vol. 4, no. 4, pp. 607-616, December 1999, or X. Zhang, S. Fronz, and N. Navab: "Visual marker detection and decoding in AR systems": A comparative study, Proc. of International Symposium on Mixed and Augmented Reality (ISMAR'02), 2002.

However, such a complicated index cannot be stably detected from a captured image, unless the index image occupies a sufficiently large area in the entire captured image surface. In other words, a relatively wide region of the physical space must be provided for the index, or the camera must be sufficiently close to the index. Thus, such an index will encounter severe conditions in setting or arrangement.

Furthermore, there is a conventional method for using an LED or comparable light-emitting element or a retroreflector, as a distinctive index having a smaller size. However, according to this method, there will be an erroneous detection if a light-emitting element or reflector similar to the index is present.

For example, as shown in FIG. 10, a light-emitting element 203 may be present in the background space of an index 205 mounted on a physical object 204. The index 205 is a luminescent ball capable of, for example, emitting infrared light. The light-emitting element 203 is an electric bulb capable of emitting infrared light.

FIG. 11 shows an image captured by an infrared camera 101 through a visible light cutting (i.e., infrared light transmitting) filter 202, which includes bright circular regions corresponding to the light-emitting element 203 and the index 205.

In this case, if the processing for detecting a brighter region corresponding to the index 205 is applied to the image, not only a circular region 301 corresponding to the index 205 but also a circular region 302 corresponding to the light-emitting element 203 will be detected as regions having the brightness of the index 205. In such a case, it is difficult to identify the index 205 between two candidate regions 301 and 302. Accordingly, if an index and a similar body which are not distinctive in brightness are present in a physical space captured by a camera, erroneous recognition of the index will occur.

Furthermore, there is a conventional method using a plurality of light-emitting elements (or reflectors) disposed, as indices, at predetermined positions in a mutually fixed relationship, and discriminating individual indices based on a detected positional relationship. However, if one or more light-emitting elements (or reflectors) are concealed, discrimination of the index is unfeasible. Furthermore, disposing a large number of indices in a limited physical space may deteriorate the visibility of the physical space.

On the other hand, the conventional technique 3 requires a light emission timing control mechanism or a high-speed camera, because the light emission timing must be controlled in a time division fashion to discriminate individual indices. Thus, the cost increases.

SUMMARY OF THE INVENTION

The present invention is directed to a technique capable of solving or at least mitigating the above-described problems.

At least one exemplary embodiment is directed to an information processing method including: a first image inputting step of inputting a first image captured by an imaging apparatus configured to capture a physical space; a second image inputting step of inputting a second image captured by an outside-in capture unit configured to capture the imaging apparatus from an outside-in view position; a first detecting step of detecting a feature quantity relating to image coordinates of a first index in the physical space, based on the first image input in the first image inputting step; a second detecting step of detecting a feature quantity relating to image coordinates of a candidate region relevant to a second index on the imaging apparatus, based on the second image input in the second image inputting step; and an identifying step of identifying the candidate region as the second index, based on the feature quantity relating to the image coordinates of the first index detected in the first detecting step and the feature quantity relating to the image coordinates of the candidate region relevant to the second index.

Furthermore, at least one exemplary embodiment is directed to an information processing method, including: a first image inputting step of inputting a first image captured by an imaging apparatus mounted on an object body and configured to capture a physical space; a second image inputting step of inputting a second image captured by an outside-in capture unit configured to capture the object body from an outside-in view position; a first detecting step of detecting a feature quantity relating to image coordinates of a first index in the physical space, based on the first image input in the first image inputting step; a second detecting step of detecting a feature quantity relating to image coordinates of a candidate region relevant to a second index on the object body, based on the second image input in the second image inputting step; and an identifying step of identify the candidate region as the second index, based on the feature quantity relating to the image coordinates of the first index detected in the first detecting step and the feature quantity relating to the image coordinates of the candidate region relevant to the second index.

Furthermore, at least one exemplary embodiment is directed to a computer program stored in a computer-readable medium for causing a computer to execute the above-described information processing method.

Furthermore, at least one exemplary embodiment is directed to an information processing apparatus including: a first image input unit arranged to input a first image captured by an imaging apparatus configured to capture a physical space; a second image input unit arranged to input a second image captured by an outside-in capture unit configured to capture the imaging apparatus from an outside-in view position; a first detecting unit arranged to detect a feature quantity relating to image coordinates of a first index in the physical space, based on the first image input by the first image input unit; a second detecting unit arranged to detect a feature quantity relating to image coordinates of a candidate region relevant to a second index on the imaging apparatus, based on the second image input by the second image input unit; an identifying unit arranged to identify the candidate region as the second index, based on the feature quantity relating to the image coordinates of the first index and the feature quantity relating to the image coordinates of the candidate region relevant to the second index.

Moreover, at least one exemplary embodiment is directed to an information processing apparatus including: a first image input unit arranged to input a first image captured by an imaging apparatus mounted on an object body and configured to capture a physical space; a second image input unit arranged to input a second image captured by an outside-in capture unit configured to capture the object body from an outside-in view position; a first detecting unit arranged to detect a feature quantity relating to image coordinates of a first index in the physical space, based on the first image input by the first image input unit; a second detecting unit arranged to detect a feature quantity relating to image coordinates of a candidate region relevant to a second index on the object body, based on the second image input by the second image input unit; an identifying unit arranged to identify the candidate region as the second index, based on the feature quantity relating to the image coordinates of the first index and the feature quantity relating to the image coordinates of the candidate region relevant to the second index.

Further features of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 9 is a view illustrating examples of a conventionally used practical index.

FIG. 12 is a flowchart showing processing for calculating the position and orientation of an imaging apparatus (or an object body) in accordance with a modified embodiment.

DETAILED DESCRIPTION OF THE EMBODIMENTS

Figure 1:
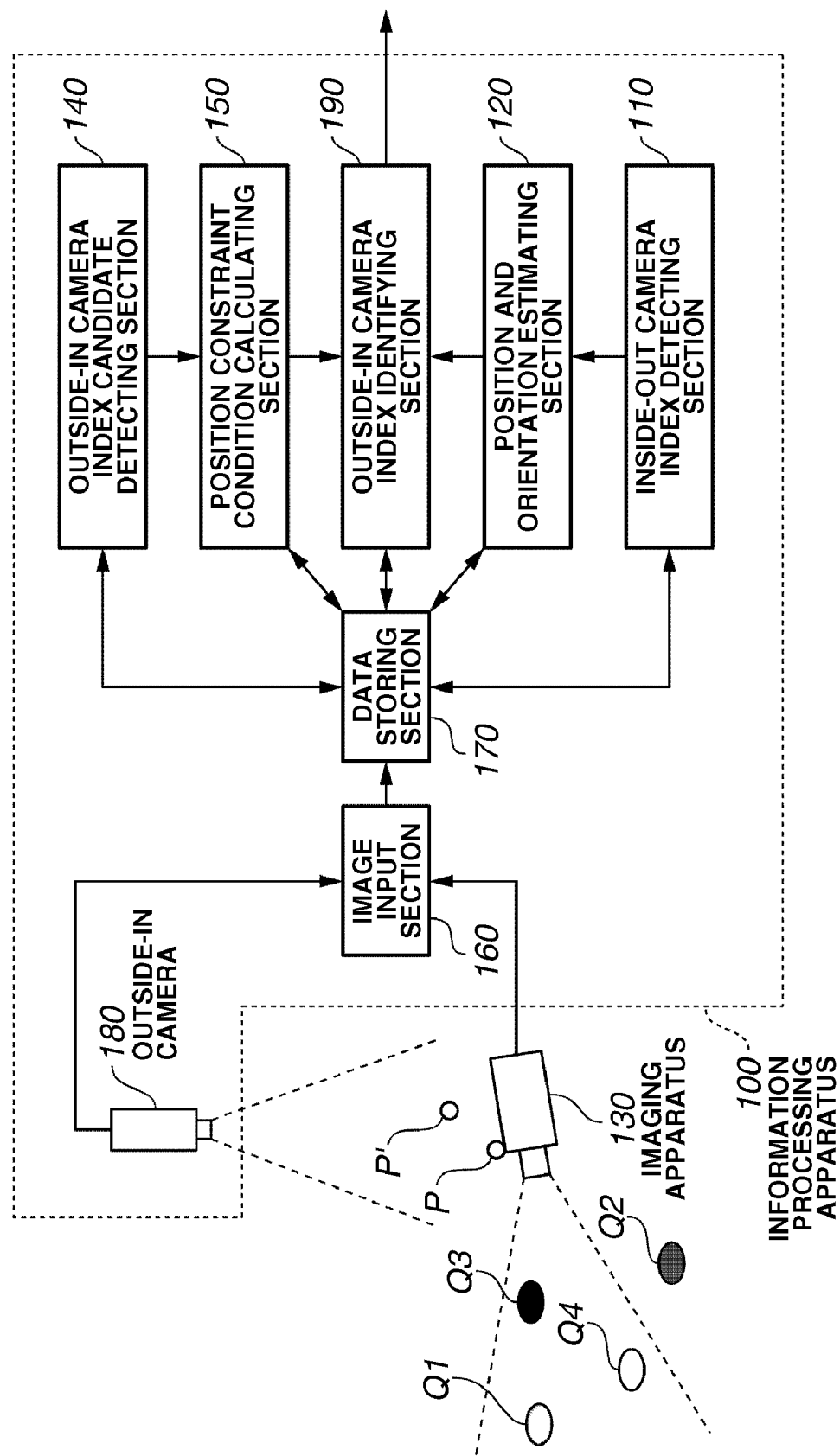
FIG. 1 is a block diagram illustrating a schematic arrangement of an information processing apparatus in accordance with a first exemplary embodiment.

The following description of exemplary embodiments is merely illustrative in nature and is in no way intended to limit the invention, its application, or uses.

Processes, techniques, apparatus, and materials as known by one of ordinary skill in the art may not be discussed in detail but are intended to be part of the enabling description where appropriate. For example, certain circuitry for signal processing, calculating, and other uses may not be discussed in detail. However these systems and the methods to fabricate these system as known by one of ordinary skill in the relevant art is intended to be part of the enabling disclosure herein where appropriate.

It is noted that throughout the specification, similar reference numerals and letters refer to similar items in the following figures, and thus once an item is defined in one figure, it may not be discussed for following figures.

Exemplary embodiments will be described in detail below with reference to the drawings.

First Exemplary Embodiment

An information processing apparatus according to a first exemplary embodiment can identify an index based on an estimated position of an imaging apparatus. An information processing apparatus and an information processing method according to the present exemplary embodiment will be described below with reference to the attached drawings.

FIG. 1 is a block diagram illustrating a schematic arrangement of an exemplary information processing apparatus 100.

The information processing apparatus 100 includes a camera (an "outside-in" camera 180), an image input section 160, a data storing section 170, an "inside-out" camera index detecting section 110, a position and orientation estimating section 120, an "outside-in" camera index candidate detecting section 140, a position constraint condition calculating section 150, and an "outside-in" camera index identifying section 190. The information processing apparatus 100 is connected to an imaging apparatus 130. The "outside-in" camera 180 is a camera disposed at a predetermined position to capture an image of the imaging apparatus 130.

A predetermined number of indices that can be captured by the imaging apparatus 130 (hereinafter, referred to as "inside-out camera indices") are provided at predetermined positions in a physical space. More specifically, plural inside-out camera indices $Q_k$ (k=1, ..., $K_Q$) are disposed at predetermined positions $x_W^{Qk}$ defined in a world coordinate system (i.e., a coordinate system having an origin defined in a physical space and X-, Y-, and Z-axes perpendicular to each other and extending from the origin).

An index that can be captured by the outside-in camera 180 (hereinafter, referred to as an "outside-in camera index") is provided on the imaging apparatus 130. More specifically, an outside-in camera index P is disposed at a predetermined position $x_C^P$ defined in an imaging apparatus coordinate system (i.e., a coordinate system having an origin defined on the imaging apparatus 130 and X-, Y-, and Z-axes perpendicular to each other and extending from the origin).

It is preferable that at least three inside-out camera indices $Q_k$ can be stably observed on an inside-out view image obtained by the imaging apparatus 130 when the imaging apparatus 130 is positioned at an arbitrary point in a visual field of the outside-in camera 180. Furthermore, it is preferable that the outside-in camera index P can be stably observed on an outside-in view image obtained by the outside-in camera 180.

The example shown in FIG. 1 includes four inside-out camera indices $Q_1$, $Q_2$, $Q_3$, and $Q_4$ and one outside-in camera index P. Furthermore, a pseudo index P' similar to the outside-in camera index P is present in the physical space. Three inside-out camera indices $Q_1$, $Q_3$, and $Q_4$ are in the visual field of the imaging apparatus 130. One outside-in camera index P and one pseudo index P' are present in the visual field of the outside-in camera 180.

The inside-out camera indices $Q_k$ can be, for example, circular markers having different colors, or can be natural features or other feature points having different texture features. Furthermore, the inside-out camera indices $Q_k$ can be rectangular indices such as rectangular monochrome regions each having an appropriate size, or can be configured into any other indices if the image coordinates of each index can be detected when it is projected on a photographed image and when this index can be discriminated according to an appropriate method. Furthermore, each index can be intentionally provided or can be any natural index that is not intentionally provided.

The outside-in camera index P is, for example, configured with an LED or a retroreflector, because it must be stably detected on an image captured by an outside-in camera having a wide viewing angle from a distant place.

The image input section 160 receives an image produced by the imaging apparatus 130 (hereinafter, referred to as an "inside-out view image"). Furthermore, the image input section 160 receives an image produced by the outside-in camera 180 (hereinafter, referred to as an "outside-in view image").

The outside-in camera 180 is stationarily disposed at a predetermined position so that the outside-in camera 180 can capture the outside-in camera index P on the imaging apparatus 130. The data storing section 170 can store information relating to the position and orientation of the outside-in camera 180 beforehand as known values defined in the world coordinate system.

The image input section 160 can convert the inside-out view image and the outside-in view image input into the information processing apparatus 100 into digital data. The data storing section 170 can store the digital data received from the image input section 160.

The inside-out camera index detecting section 110 can input a digital inside-out view image from the data storing section 170, and detect image coordinates of inside-out camera indices in the input image.

For example, if the inside-out camera indices are markers having different colors, the inside-out camera index detecting section 110 can detect the regions corresponding to respective marker colors from the input image, and identify the centroid positions of detected regions as detected coordinates of the inside-out camera indices.

Furthermore, if the inside-out camera indices are feature points having different texture features, the inside-out camera index detecting section 110 can apply template matching to the input image to detect the positions of the inside-out camera indices. To this end, the inside-out camera index detecting section 110 can store template images of respective inside-out camera indices beforehand as known information.

Furthermore, if the inside-out camera indices are rectangular indices, the inside-out camera index detecting section 110 can apply binarization processing to an input image and then perform labeling to detect each region defined by four straight lines as an index candidate.

Then, the inside-out camera index detecting section 110 can determine whether there is any specific pattern in candidate regions to exclude erroneous detection, and can obtain an identifier of the index. In the present exemplary embodiment, each rectangular index detected in this manner corresponds to four indices placed on four corners, in this specification.

Furthermore, the inside-out camera index detecting section 110 can input an estimated position of the imaging apparatus 130 (i.e., an output obtained from the position and orientation estimating section 120) from the data storing section 170, and can predict the positions of the inside-out camera indices on the image based on the estimated position so as to limit a search range. Thus, the calculation load in the processing for detecting the inside-out camera indices can be reduced, and the possibility of erroneously detecting or identifying the inside-out camera indices can be lowered.

Furthermore, the inside-out camera index detecting section 110 can output image coordinates of each detected index and an identifier of this index to the data storing section 170. In the following description, $Q_{kn}$ represents an index detected on the inside-out view image when the detected index has an identifier n (n=1, . . . , N), where N represents the total number of indices detected on the inside-out view image. Furthermore, $u^{Qkn}$ represents image coordinates of the detected index $Q_{kn}$. For example, in the example shown in FIG. 1 (i.e., N=3), the inside-out camera index detecting section 110 can output image coordinates $u^{Qk1}$, $u^{Qk2}$, and $u^{Qk3}$ of the indices having identifiers $k_1=1$, $k_2=3$, and $k_3=4$.

The position and orientation estimating section 120 can input, from the data storing section 170, a combination of the image coordinates $u^{Qkn}$ of each inside-out camera index detected by the inside-out camera index detecting section 110 and corresponding world coordinates $x_W^{Qkn}$ stored beforehand as known information. The position and orientation estimating section 120 can estimate the position and orientation of the imaging apparatus 130 based on the combined information. For example, the estimated position and orientation can be expressed in terms of a combination of a three-dimensional vector $x_W^C$ representing the position and a 3×3 matrix $R_{WC}$ representing the orientation, and can be outputted to the data storing section 170.

A method for calculating the position and orientation of the imaging apparatus 130 based on a combination of the world coordinates and the image coordinates of the inside-out camera indices is known in the field of photogrammetry or the like (for example, refer to R. M. Haralick, C. Lee, K. Ottenberg, and M. Nolle: "Review and analysis of solutions of the three point perspective pose estimation problem," International Journal of Computer Vision, vol. 13, no. 3, pp. 331-356, 1994, or D. G. Lowe: "Fitting parameterized three-dimensional models to images," IEEE Transactions on PAMI, vol. 13, no. 5, pp. 441-450, 1991).

The outside-in camera index candidate detecting section 140 can input a digital outside-in view image from the data storing section 170, and can detect image coordinates of an outside-in camera index (and a pseudo index) on the input outside-in view image.

For example, the outside-in camera index candidate detecting section 140 can detect a region having the brightness of the LED or the retroreflector on the image, and identify the centroid positions of detected regions as detected coordinates of the outside-in camera indices.

Furthermore, the outside-in camera index candidate detecting section 140 can output the image coordinates of detected outside-in camera index candidates to the data storing section 170. In the following description, $P_m$ represents an outside-in camera index candidate detected on the outside-in view image when the detected outside-in camera index candidate has an identifier m (m=1, . . . , M), where M represents the total number of the detected outside-in camera index candidates on the outside-in view image. Furthermore, $u^{Pm}$ represents image coordinates of the detected outside-in camera index candidate $P_m$. For example, in the example shown in FIG. 1 (i.e., M=2), the outside-in camera index candidate detecting section 140 can output image coordinates $u^{P1}$ and $u^{P2}$.

The position constraint condition calculating section 150 can input, from the data storing section 170, the image coordinates $u^{Pm}$ of each outside-in camera index candidate detected by the outside-in camera index candidate detecting section 140 and the position and orientation of the outside-in camera 180 defined in the world coordinate system. Then, the position constraint condition calculating section 150 can calculate the position constraint conditions of each outside-in camera index candidate based on the input information. In the present exemplary embodiment, the position constraint conditions are parameters describing straight lines that constrain the position.

The outside-in camera index identifying section 190 can identify an outside-in camera index based on the position and orientation of the imaging apparatus 130 estimated by the position and orientation estimating section 120 and the position constraint conditions of each outside-in camera index candidate calculated by the position constraint condition calculating section 150.

The data storing section 170 can hold various data, such as image data input from the image input section 160, estimated position data input from the position and orientation estimating section 120, image coordinates and identifier of each index input from the inside-out camera index detecting section 110, image coordinates of each index candidate input from the outside-in camera index candidate detecting section 140, as well as world coordinates (i.e., known values) of inside-out camera indices, imaging apparatus coordinates of the outside-in camera index (i.e., coordinate values in the imaging apparatus coordinate system), and camera parameters of the outside-in camera 180. The data storing section 170 can input and output these data when required.

The image input section 160, the data storing section 170, the inside-out camera index detecting section 110, the position and orientation estimating section 120, the outside-in camera index candidate detecting section 140, the position constraint condition calculating section 150, and the outside-in camera index identifying section 190, shown in FIG. 1, can be separate units, or can be a software program installable in a single or plural computers and executable by a central processing unit (CPU) in the computer to realize the functions.

In the present exemplary embodiment, a single computer executes the software program to realize the functions of the above-described plural sections (i.e., the image input section 160, the data storing section 170, the inside-out camera index detecting section 110, the position and orientation estimating section 120, the outside-in camera index candidate detecting section 140, the position constraint condition calculating section 150, and the outside-in camera index identifying section 190).

Figure 2:
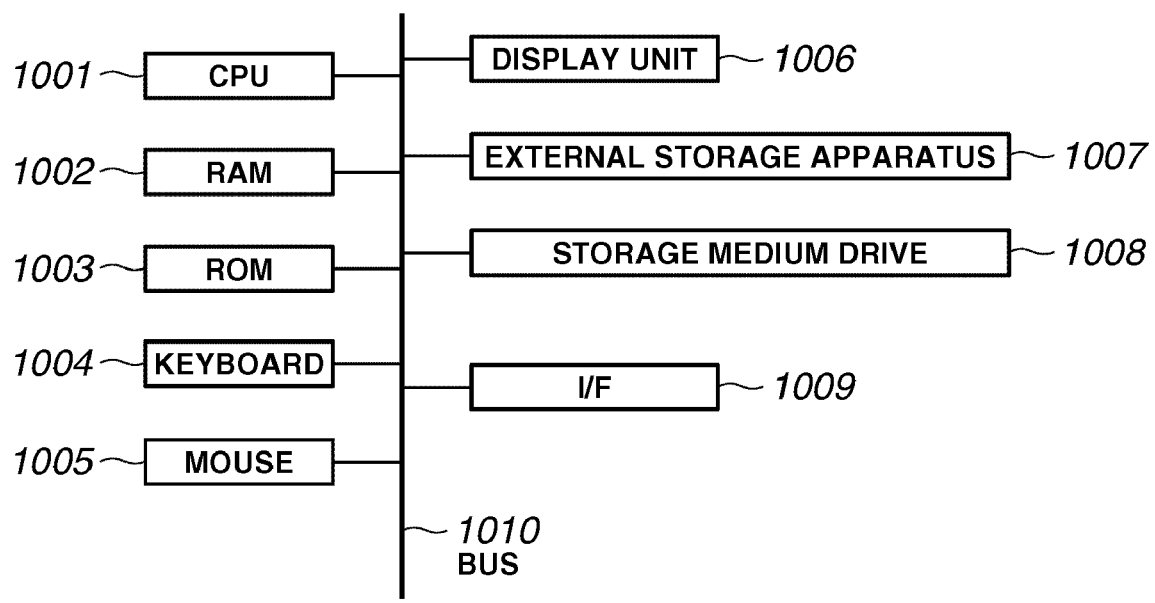
FIG. 2 is a block diagram illustrating a fundamental arrangement of a computer that can execute software programs for realizing functions of the information processing apparatus shown in FIG. 1.

FIG. 2 is a block diagram showing a fundamental arrangement of a computer that can execute a software program to realize the functions of the image input section 160, the data storing section 170, the inside-out camera index detecting section 110, the position and orientation estimating section 120, the outside-in camera index candidate detecting section 140, the position constraint condition calculating section 150, and the outside-in camera index identifying section 190.

A CPU 1001 can perform overall control of the computer based on programs or data stored in a RAM 1002 or a ROM 1003, and control the execution of software programs to realize the functions of the image input section 160, the data storing section 170, the inside-out camera index detecting section 110, the position and orientation estimating section 120, the outside-in camera index candidate detecting section 140, the position constraint condition calculating section 150, and the outside-in camera index identifying section 190.

The RAM 1002 has an area temporarily storing programs and data loaded from an external storage apparatus 1007 or from a storage medium drive 1008, and a work area for various processing performed by the CPU 1001. The RAM 1002 can realize the function of the data storing section 170.

The ROM 1003 can store storage programs and setting data of the computer. A keyboard 1004 and a mouse 1005 allow an operator of the computer to input various instructions to the CPU 1001.

A display unit 1006 can be a cathode-ray tube (CRT) or a liquid crystal screen, which is capable of displaying a message or the like, for example, required in the position and orientation measurement of the imaging apparatus 130.

The external storage apparatus 1007 can function as a mass information storage apparatus, such as a hard disk, which is capable of storing an OS (operating system) and software programs. Furthermore, the known information in the present exemplary embodiment can be stored in the external storage apparatus 1007 and can be loaded to the RAM 1002 if necessary.

The storage medium drive 1008 can read programs and data stored in a CD-ROM, a DVD-ROM, or another storage medium in accordance with an instruction supplied from the CPU 1001 and output readout programs and data to the RAM 1002 or to the external storage apparatus 1007.

An interface (I/F) 1009 includes an analog video port or an IEEE 1394 or another digital input/output port, through which the imaging apparatus 130 can be connected to the computer, an RS232C or USB serial port, through which an orientation sensor (not shown) can be connected to the computer, and an Ethernet (registered trademark) port, through which information relating to each identified index can be outputted to an external device. The data input through the interface 1009 can be stored in the RAM 1002. The interface 1009 can realize part of the function of the image input section 160.

The above-described constituent components are mutually connected via a bus 1010.

Figure 3:
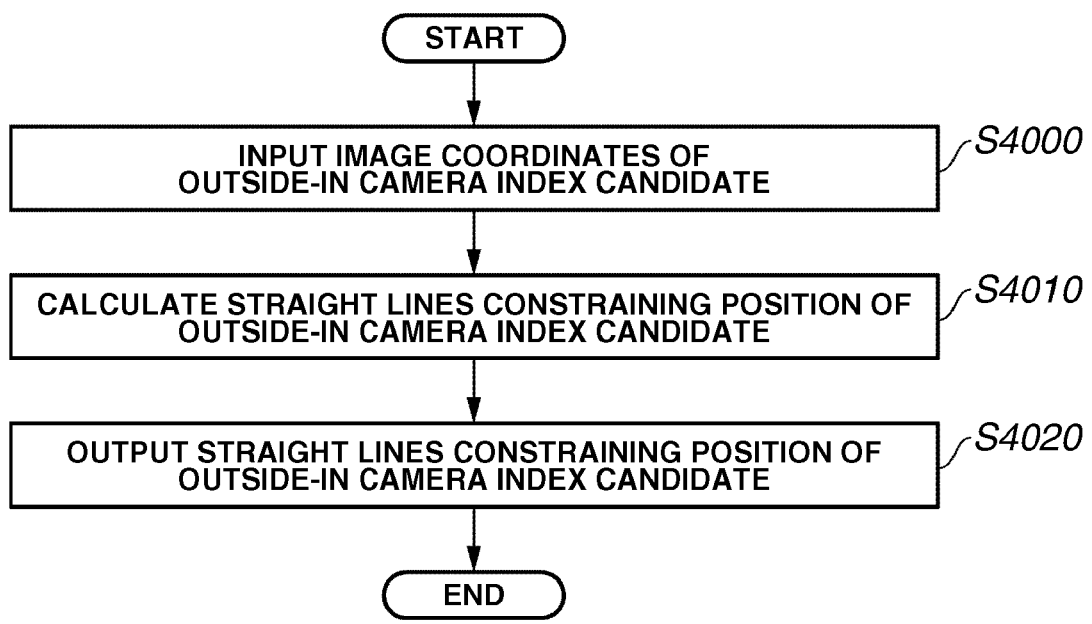
FIG. 3 is a flowchart showing processing for calculating straight lines constraining the position of an outside-in camera index candidate in accordance with the first exemplary embodiment.

FIG. 3 is a flowchart showing processing performed by the CPU 1001 for calculating straight lines constraining the position of an outside-in camera index candidate $P_m$. The processing is realized when the CPU 1001 executes a software program corresponding to the function of the position constraint condition calculating section 150. In this case, the program code for the flowchart is already loaded in the RAM 1002 before the CPU 1001 performs the following processing.

In step S4000, the position constraint condition calculating section 150 inputs, from the data storing section 170, the image coordinates $u^{P_m}$ of each outside-in camera index candidate $P_m$ detected by the outside-in camera index candidate detecting section 140.

In step S4010, the position constraint condition calculating section 150 calculates, based on the image coordinates $u^{P_m}$, parameters representing straight lines that constrain the position of each outside-in camera index candidate $P_m$ in the world coordinate system.

More specifically, the position constraint condition calculating section 150 calculates gradients $h_{x_m}$, $h_{y_m}$, and $h_{z_m}$ of the straight lines in the world coordinate system, based on the image coordinates $u^{P_m}$, according to the following formula (1), and designates the values $h_{x_m}$, $h_{y_m}$, and $h_{z_m}$ as parameters of the straight lines.

$$\begin{bmatrix} h_{x_m} \\ h_{y_m} \\ h_{z_m} \\ 0 \end{bmatrix} = R_{WB} \cdot \begin{bmatrix} u_x^{P_m}/f_x^B \\ u_y^{P_m}/f_y^B \\ 1 \\ 0 \end{bmatrix}$$

In the formula (1), $f^B_x$ and $f^B_y$ represent focal lengths of the outside-in camera 180 in the x-axis direction and the y-axis direction, respectively, which are stored beforehand, as known values, in the data storing section 170. Furthermore, $R_{WB}$ is a rotation matrix converting the orientation in the outside-in camera coordinate system into a corresponding orientation in the world coordinate system. The rotation matrix $R_{WB}$ is calculated beforehand based on the orientation of the outside-in camera 180 in the world coordinate system. The orientation of the outside-in camera 180 is stored beforehand, as known values, in the data storing section 170.

In this case, a point on a straight line in the world coordinate system can be expressed in terms of the following formula (2) (i.e., a function expression using a parameter τ)

$$l_{W_m}(\tau) = \begin{bmatrix} h_{x_m}\tau + x_{WB} \\ h_{y_m}\tau + y_{WB} \\ h_{z_m}\tau + z_{WB} \\ 1 \end{bmatrix} \quad (2)$$

In the formula (2), $x_{WB}$, $y_{WB}$, and $Z_{WB}$ represent the position of the outside-in camera 180 in the world coordinate system, which is stored beforehand, as known values, in the data storing section 170.

In step S4020, the position constraint condition calculating section 150 outputs, to the data storing section 170, the gradients $h_{xm}$, $h_{ym}$, and $h_{zm}$ of the straight lines in the world coordinate system that constrain the position of each outside-in camera index candidate $P_m$.

Accordingly, the straight lines expressed by the formula (2) passes through the position of the outside-in camera 180 in the world coordinate system and the position of the outside-in camera index candidate $P_m$ in the world coordinate system. The position of the outside-in camera index candidate $P_m$ in the world coordinate system can be obtained when the parameter τ takes an appropriate value.

Figure 4:
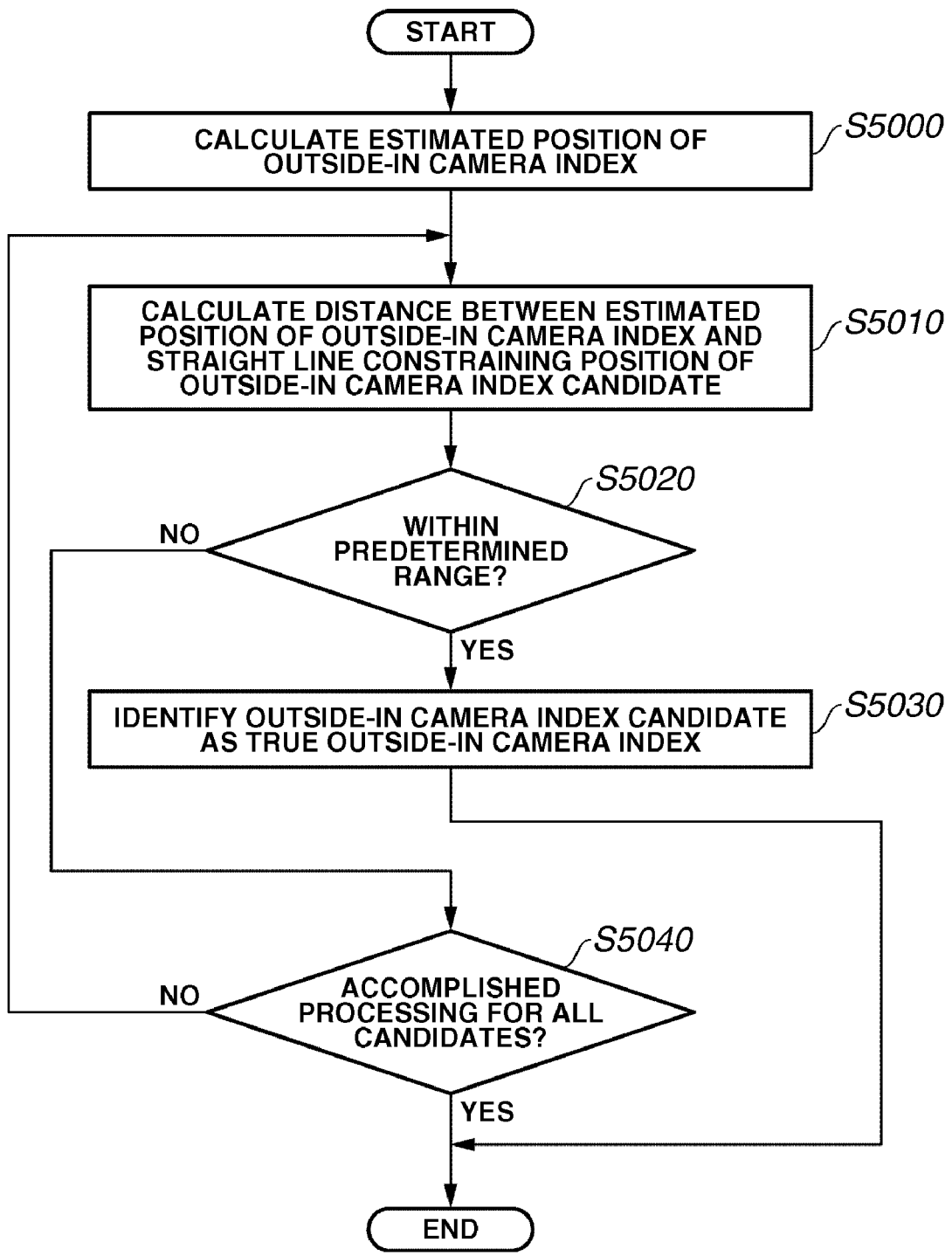
FIG. 4 is a flowchart showing processing for identifying an outside-in camera index in accordance with the first exemplary embodiment.

FIG. 4 is a flowchart showing processing performed by the CPU 1001 for identifying each outside-in camera index. The processing is realized when the CPU 1001 executes a software program corresponding to the function of the outside-in camera index identifying section 190. The processing according to the flowchart can be accomplished by executing the processing of step S5000 and then executing the processing of step S5010 through step S5030 for each outside-in camera index candidate. In this case, the program code for the flowchart is already loaded in the RAM 1002 before the CPU 1001 performs the following processing.

In step S5000, the outside-in camera index identifying section 190 inputs, from the data storing section 170, the three-dimensional vector $x_W^C$ representing the position of the imaging apparatus 130 and the 3×3 matrix $R_{WC}$ representing the orientation of the imaging apparatus 130, which have been estimated by the position and orientation estimating section 120. Then, the outside-in camera index identifying section 190 calculates an estimated position of the outside-in camera index P based on the input information.

More specifically, the outside-in camera index identifying section 190 calculates the estimated position $x_W^P$ of the outside-in camera index P in the world coordinate system according to the following formula (3).

$$X_W^P = X_W^C + R_{WC} \cdot X_C^P \quad (3)$$

In the formula (3), $x_C^P$ represents coordinates of the outside-in camera index P in the imaging apparatus coordinate system, which are stored beforehand, as known information, in the data storing section 170.

When the position of the outside-in camera index P is sufficiently close to the origin of the imaging apparatus coordinate system, the processing of this step can be omitted because the estimated position of the imaging apparatus can be used as the estimated position of the outside-in camera index P. In this case, the position and orientation estimating section 120 does not need to hold, in the data storing section 170, the 3×3 matrix $R_{WC}$ representing the orientation of the imaging apparatus 130.

In step S5010, the outside-in camera index identifying section 190 calculates a distance between the estimated position $x_W^P$ of the outside-in camera index P and a straight line $l_{Wm}(\tau)$ constraining the position of a target outside-in camera index candidate $P_m$.

More specifically, the outside-in camera index identifying section 190 calculates a minimum value of the right side (i.e., a secondary function expression using the parameter τ) of the following formula (4) representing the square of distance $d_m$ and obtains a positive square root of the minimum value.

$$d_m^2 = \|x_W^P - l_{Wm}(\tau)\| \quad (4)$$

In step S5020, the outside-in camera index identifying section 190 determines whether the distance dm obtained in step S5010 is within a predetermined range.

When the distance $d_m$ is within the predetermined range (i.e., YES in step S5020), the processing flow proceeds to step S5030. In step S5030, the outside-in camera index identifying section 190 identifies the outside-in camera index candidate as a true outside-in camera index. For example, the outside-in camera index identifying section 190 outputs image coordinates of the identified outside-in camera index via the interface 1009 to an external device and terminates the processing routine.

On the other hand, when the distance $d_m$ is not within the predetermined range (i.e., NO in step S5020), the processing flow proceeds to step S5040. In step S5040, the outside-in camera index identifying section 190 determines whether the above-described processing of steps S5010 through S5030 is accomplished for all outside-in camera index candidates $P_m$. When the determination in step S5040 is YES, the outside-in camera index identifying section 190 terminates the processing routine.

On the other hand, when the determination in step S5040 is NO, the processing flow returns to step S5010 and the outside-in camera index identifying section 190 performs the processing of steps S5010 through S5030 for the remaining outside-in camera index candidates $P_m$.

With the above-described processing, the outside-in camera index identifying section 190 can identify a true outside-in camera index among outside-in camera index candidates.

In the present exemplary embodiment, only one imaging apparatus (i.e., one outside-in camera index) is used. However, it is possible to use plural imaging apparatuses (i.e., plural outside-in camera indices).

More specifically, the outside-in camera index identifying section 190 can perform the processing of steps S5000 to S5040 for each outside-in camera index P, and can identify each outside-in camera index from outside-in camera index candidates detectable from an outside-in view image.

According to the present exemplary embodiment, a true index can be accurately identified from an image even when a region similar to the index is present in the physical space and this region is erroneously detected as an index candidate region.

Furthermore, the present exemplary embodiment does not require any light emission timing control mechanism or high-speed camera used in the above-described conventional technique 3. As a result, the cost can be lowered.

Second Exemplary Embodiment

An information processing apparatus according to a second exemplary embodiment includes a second outside-in camera in addition to the arrangement of the information processing apparatus described in the first exemplary embodiment. An information processing apparatus and an information processing method according to the second exemplary embodiment will be described below with reference to the attached drawings.

Figure 5:
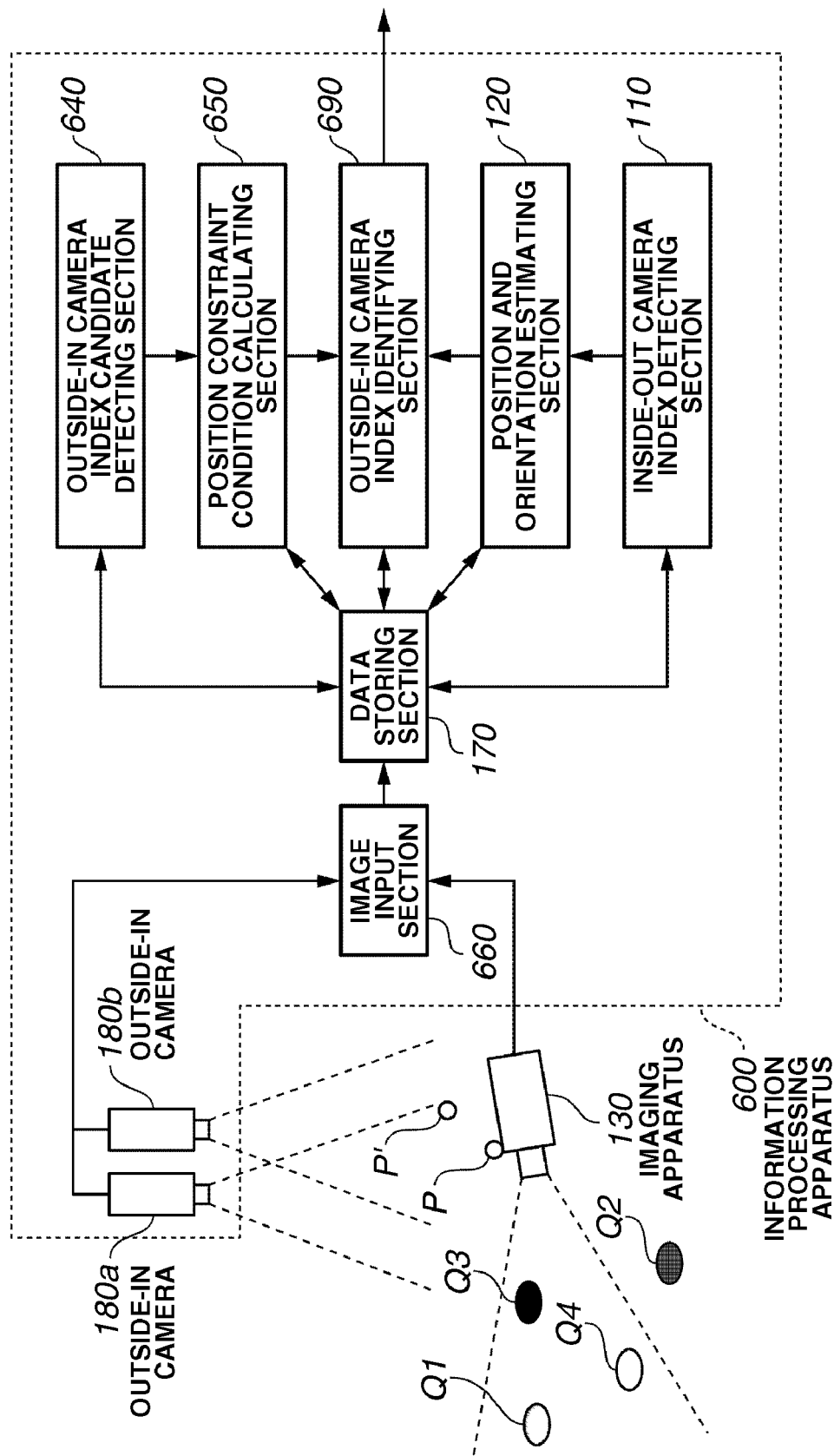
FIG. 5 is a block diagram illustrating a schematic arrangement of an information processing apparatus in accordance with a second exemplary embodiment.

FIG. 5 is a block diagram illustrating an information processing apparatus according to the second exemplary embodiment. The sections denoted by the same reference numerals as those described in the first exemplary embodiment (shown in FIG. 1) can function in the same manner and will not be described below in detail.

As shown in FIG. 5, the information processing apparatus 600 of the second exemplary embodiment includes outside-in cameras 180a and 180b, an image input section 660, a data storing section 170, an inside-out camera index detecting section 110, a position and orientation estimating section 120, an outside-in camera index candidate detecting section 640, a position constraint condition calculating section 650, and an outside-in camera index identifying section 690. The information processing apparatus 600 is connected to an imaging apparatus 130 (i.e., a measurement object).

Similar to the first exemplary embodiment, inside-out camera indices $Q_k$ are disposed at plural positions in the physical space. Furthermore, an outside-in camera index P is disposed on the imaging apparatus 130, whose position in the imaging apparatus coordinate system is known.

It is preferable that at least three inside-out camera indices $Q_k$ can be stably observed on an inside-out view image obtained by the imaging apparatus 130 when the imaging apparatus 130 is positioned at an arbitrary point in the visual field of the outside-in cameras 180a and 180b. Furthermore, it is preferable that the outside-in camera index P can be stably observed on an outside-in view image obtained by each of the outside-in cameras 180a and 180b.

The example shown in FIG. 5 includes four inside-out camera indices $Q_1$, $Q_2$, $Q_3$, and $Q_4$ and one outside-in camera index P. Furthermore, a pseudo index P' similar to the outside-in camera index P is present in the physical space. Three inside-out camera indices $Q_1$, $Q_3$, and $Q_4$ are in the visual field of the imaging apparatus 130. One outside-in camera index P and one pseudo index P' are present in the visual field of the outside-in cameras 180a and 180b.

The outside-in cameras 180a and 180b are stationarily disposed at predetermined positions so that the outside-in cameras 180a and 180b can stably capture the outside-in camera index P on the imaging apparatus 130. The data storing section 170 can store information relating to the position and orientation of the outside-in cameras 180a and 180b beforehand as known values defined in the world coordinate system.

The image input section 660 can convert the inside-out view image and two outside-in view images (captured by the outside-in cameras 180a and 180b) input into the information processing apparatus 600 into digital data. The data storing section 170 can store the digital data received from the image input section 660.

The outside-in camera index candidate detecting section 640 can input two outside-in view images from the data storing section 170, detect image coordinates of each outside-in camera index candidate, and output the detected image coordinates to the data storing section 170.

In the following description, $P^a_{ma}$ represents an outside-in camera index candidate detected from an outside-in view image captured by the outside-in camera 180a when the detected outside-in camera index candidate has an identifier $m_a$ ($m_a=1, \ldots, M_a$), where $M_a$ represents the total number of outside-in camera index candidates detectable from the outside-in view image captured by the outside-in camera 180a. Furthermore, $u^{Pama}$ represents image coordinates of the detected outside-in camera index candidate $P^a_{ma}$.

On the other hand, $P^b_{mb}$ represents an outside-in camera index candidate detected from an outside-in view image captured by the outside-in camera 180b when the detected outside-in camera index candidate has an identifier $m_b$ ($m_b=1, \ldots, M_b$), where $M_b$ represents the total number of outside-in camera index candidates detectable from the outside-in view image captured by the outside-in camera 180b.

Furthermore, $u^{Pbmb}$ represents image coordinates of the detected outside-in camera index candidate $P^b_{mb}$. For example, in the example shown in FIG. 5 (i.e., $M_a=M_b=2$), the outside-in camera index candidate detecting section 640 can output image coordinates $u^{Pa1a}$, $u^{Pa2a}$, $u^{Pb1b}$, and $u^{Pb2b}$.

The position constraint condition calculating section 650 can input, from the data storing section 170, the image coordinates ($u^{Pa1a}$, $u^{Pa2a}$, $u^{Pb1b}$, and $u^{Pb2b}$ according to the example shown in FIG. 5) of respective outside-in camera index candidates detected by the outside-in camera index candidate detecting section 640 and the position and orientation of the outside-in cameras 180a and 180b in the world coordinate system.

Then, the position constraint condition calculating section 650 can calculate position constraint conditions (e.g., a three-dimensional position in the present exemplary embodiment) of each outside-in camera index candidate based on the input information.

The outside-in camera index identifying section 690 can identify an outside-in camera index based on the position and orientation of the imaging apparatus 130 estimated by the position and orientation estimating section 120 and the position constraint conditions of each outside-in camera index candidate calculated by the position constraint condition calculating section 650.

The image input section 660, the data storing section 170, the inside-out camera index detecting section 110, the position and orientation estimating section 120, the outside-in camera index candidate detecting section 640, the position constraint condition calculating section 650, and the outside-in camera index identifying section 690, shown in FIG. 5, can be separate units, or can be a software program installable in a single or plural computers and executable by a CPU to realize the above-described functions.

In the present exemplary embodiment, a single computer executes a software program to realize the functions of the above-described plural sections (i.e., the image input section 660, the data storing section 170, the inside-out camera index detecting section 110, the position and orientation estimating section 120, the outside-in camera index candidate detecting section 640, the position constraint condition calculating section 650, and the outside-in camera index identifying section 690). Furthermore, the computer has a fundamental arrangement shown in FIG. 2.

Figure 6:
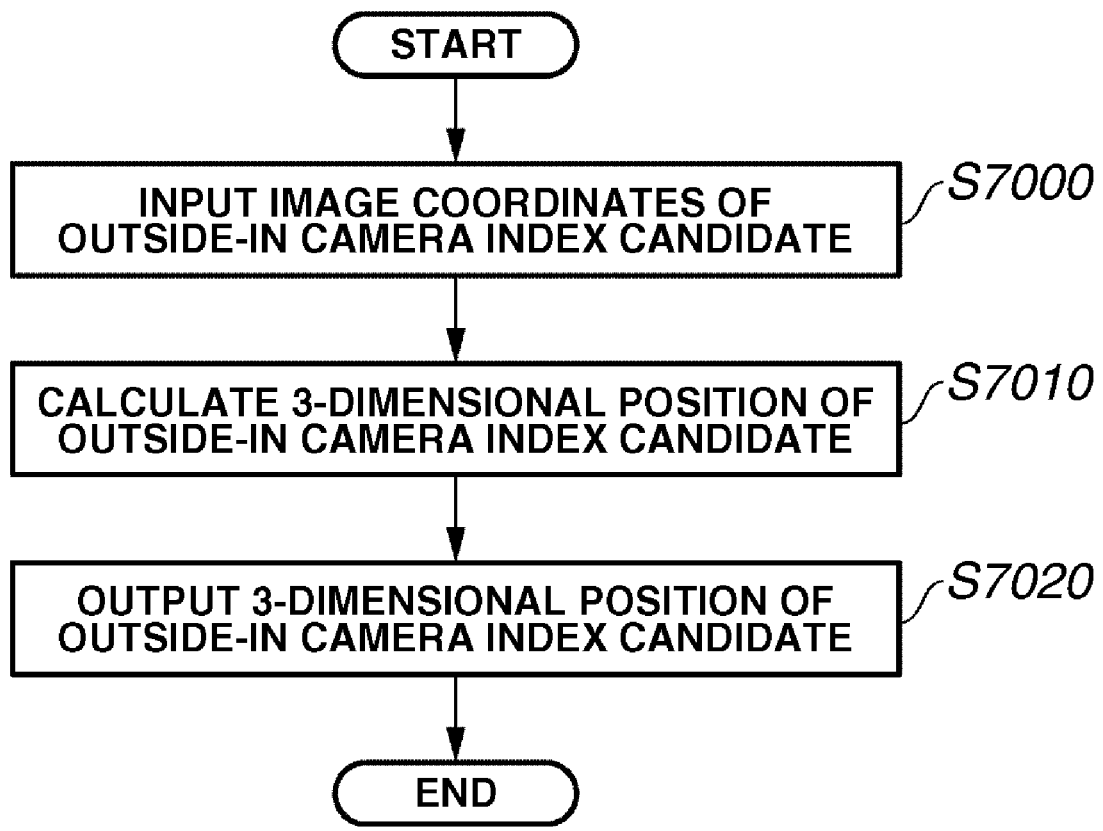
FIG. 6 is a flowchart illustrating processing for calculating a three-dimensional position of an outside-in camera index candidate in accordance with the second exemplary embodiment.

FIG. 6 is a flowchart showing processing performed by the CPU 1001 for calculating the three-dimensional position of each outside-in camera index candidate $P_m$. The processing is realized when the CPU 1001 executes the software program corresponding to the function of the position constraint condition calculating section 650. In this case, the program code for the flowchart is already loaded in the RAM 1002 before the CPU 1001 performs the following processing.

In step S7000, the position constraint condition calculating section 650 inputs, from the data storing section 170, the image coordinates (i.e., $u^{Pa1a}$, $u^{Pa2a}$, $u^{Pb1b}$, and $u^{Pb2b}$ according to the example shown in FIG. 5) of the outside-in camera index candidates ($P^a_{ma}$ and $P^b_{mb}$ according to the example shown in FIG. 5) detected by the outside-in camera index candidate detecting section 640.

In step S7010, the position constraint condition calculating section 650 correlates images of the outside-in camera index candidates using epipolar constraint and calculates a three-dimensional position $x_W^{Pm}$ of the outside-in camera index candidate $P_m$ in the world coordinate system by using image coordinates of the correlated outside-in camera index candidate $P_m$ (m=1, \ldots, M) according to the principle of triangulation. Here, M represents the total number of correlated outside-in camera index candidates.

In step S7020, the position constraint condition calculating section 650 outputs the three-dimensional position $x_W^{Pm}$ of the outside-in camera index candidate $P_m$ defined in the world coordinate system to the data storing section 170.

Figure 7:
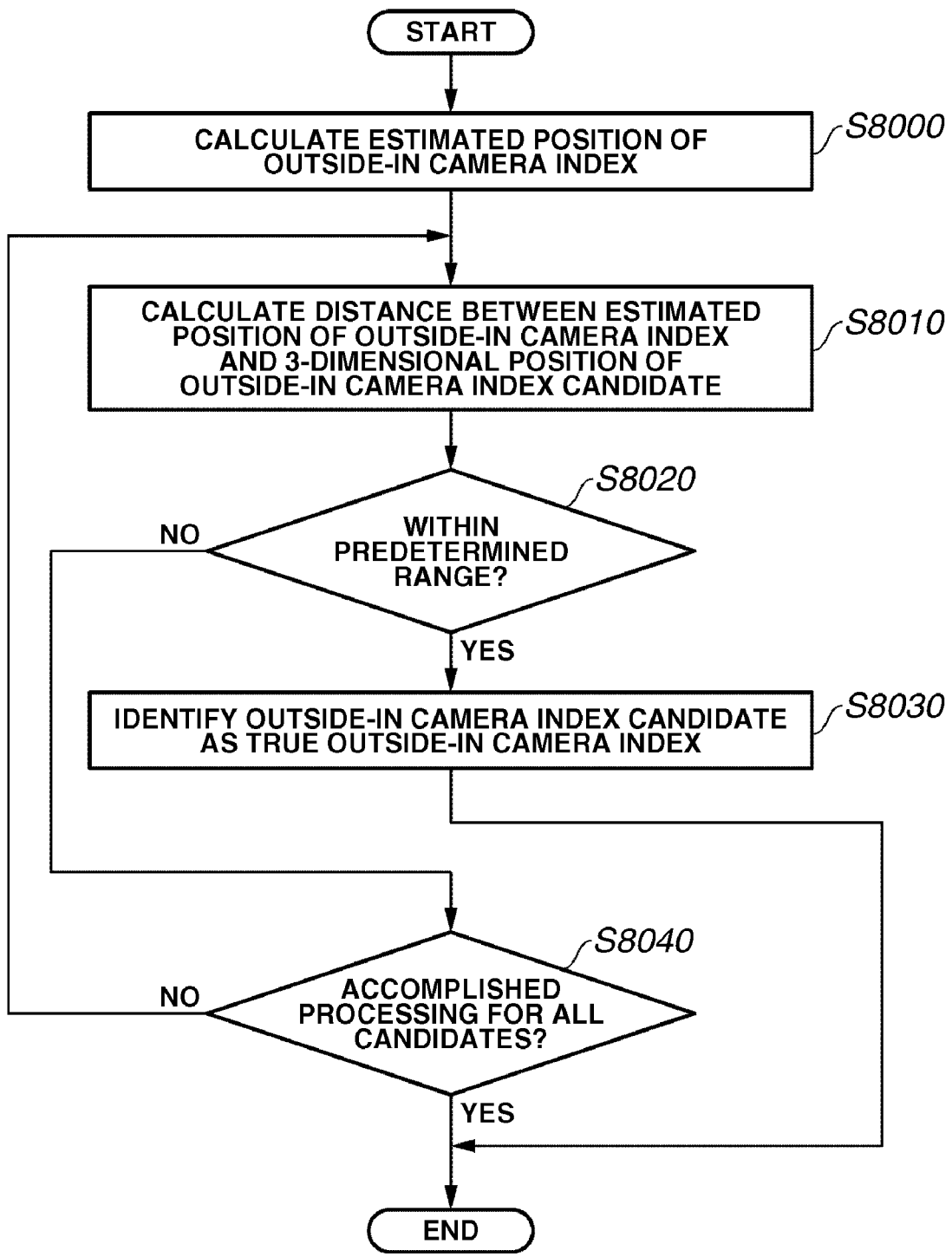
FIG. 7 is a flowchart showing processing for identifying an outside-in camera index in accordance with the second exemplary embodiment.

FIG. 7 is a flowchart showing processing performed by the CPU 1001 for identifying an outside-in camera index. The processing is realized when the CPU 1001 executes a software program corresponding to the function of the outside-in camera index identifying section 690.

The processing according to the flowchart can be accomplished by executing the processing of step S8000 and then executing the processing of step S8010 through step S8030 for each outside-in camera index candidate. In this case, the program code for the flowchart is already loaded in the RAM 1002 before the CPU 1001 performs the following processing.

In step S8000, the outside-in camera index identifying section 690 inputs, from the data storing section 170, the three-dimensional vector $x_W^C$ representing the position of the imaging apparatus 130 and the 3×3 matrix $R_{WC}$ representing the orientation of the imaging apparatus 130, which have been estimated by the position and orientation estimating section 120. Then, the outside-in camera index identifying section 690 calculates an estimated position $x_W^P$ of the outside-in camera index P according to the above-described formula (3).

In step S8010, the outside-in camera index identifying section 690 calculates a distance $d_m$ between the estimated position $x_W^P$ of the outside-in camera index P and the three-dimensional position $x_W^{Pm}$ of a target outside-in camera index candidate $P_m$ according to the following formula (5).

$$d_m = \sqrt{\|x_W^P - x_W^{Pm}\|} \quad (5)$$

In step S8020, the outside-in camera index identifying section 690 determines whether the distance dm obtained in step S8010 is within a predetermined range.

If the distance $d_m$ is within the predetermined range (i.e., YES in step S8020), the processing proceeds to step S8030. In step S8030, the outside-in camera index identifying section 690 identifies the outside-in camera index candidate as a true outside-in camera index. For example, the outside-in camera index identifying section 690 outputs image coordinates of the identified outside-in camera index via the interface 1009 to an external device and terminates the processing routine.

On the other hand, if the distance $d_m$ is not within the predetermined range (i.e., NO in step S8020), the processing flow proceeds to step S8040. In step S8040, the outside-in camera index identifying section 690 determines whether the above-described processing of steps S8010 through S8030 is accomplished for all outside-in camera index candidates $P_m$. When the determination in step S8040 is YES, the outside-in camera index identifying section 690 terminates the processing routine.

When the determination in step S8040 is NO, the processing flow returns to step S8010 and the outside-in camera index identifying section 690 performs the processing of steps S8010 through S8040 for the remaining outside-in camera index candidates $P_m$.

With the above-described processing, a true outside-in camera index can be accurately identified from an image including outside-in camera index candidates.

As described above, the information processing apparatus and information processing method according to the second exemplary embodiment does not require any light emission timing control mechanism or high-speed camera used in the above-described conventional technique 3. As a result, the cost can be lowered.

Third Exemplary Embodiment

According to the first exemplary embodiment, an outside-in camera index is provided on an imaging apparatus movable in the space. An information processing apparatus according to a third exemplary embodiment is characterized in that an outside-in camera index is provided on an arbitrary object body.

The information processing apparatus according to the third exemplary embodiment includes an object body in addition to the arrangement of the information processing apparatus according to the first exemplary embodiment. An information processing apparatus and an information processing method according to the third exemplary embodiment will be described below with reference to the attached drawings.

Figure 8:
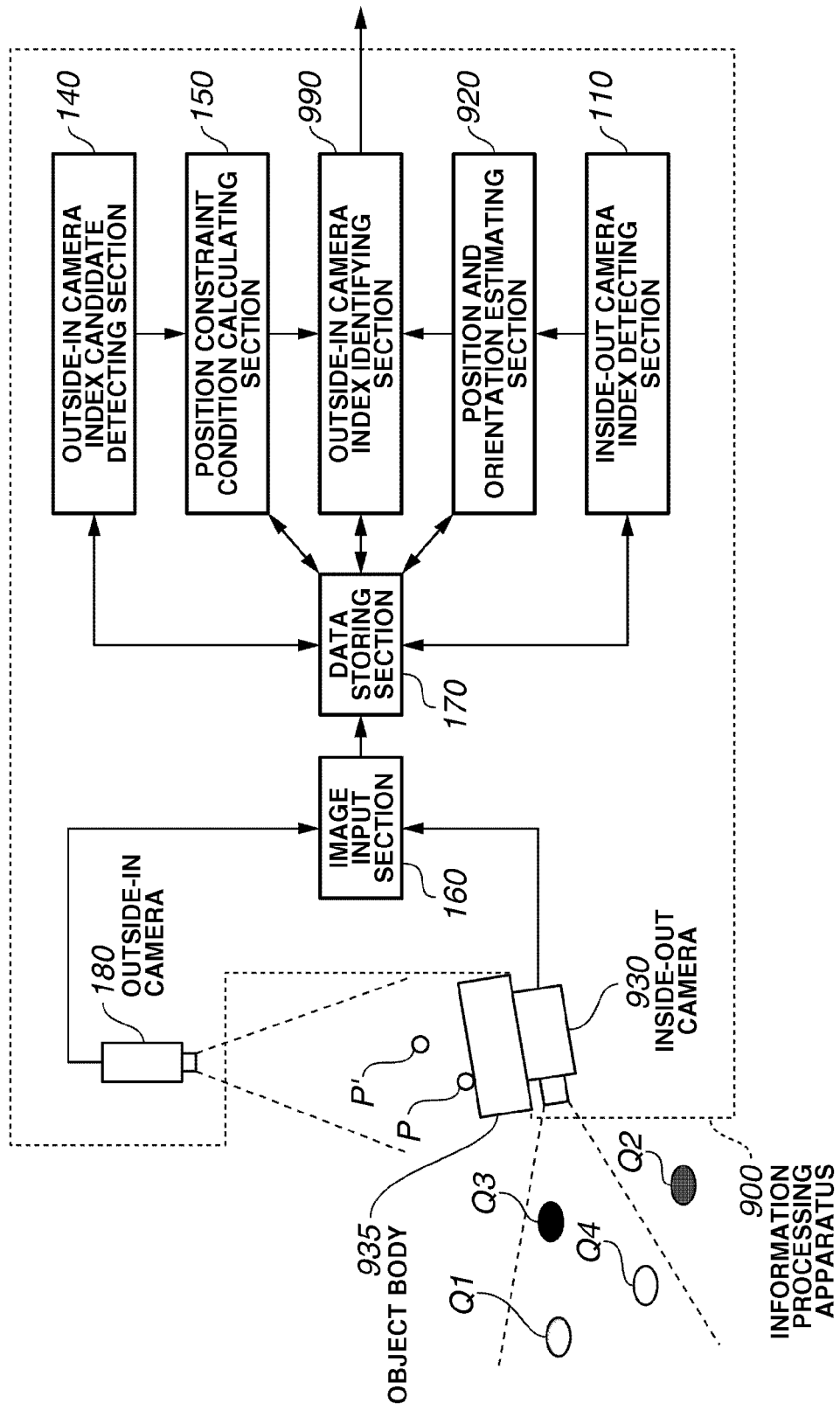
FIG. 8 is a block diagram illustrating a schematic arrangement of an information processing apparatus in accordance with a third exemplary embodiment.
Figure 10:
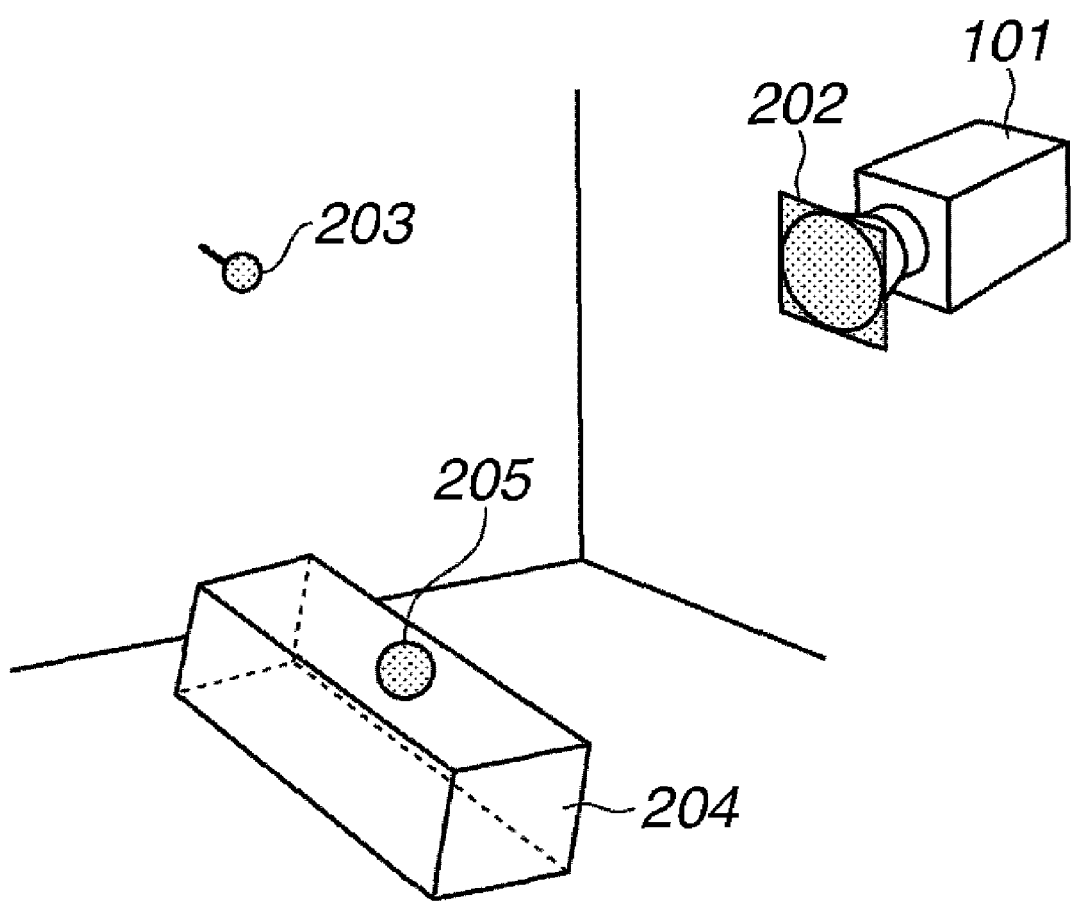
FIG. 10 is a perspective view showing an example of a physical space including a luminescent index and a light-emitting element.
Figure 11:
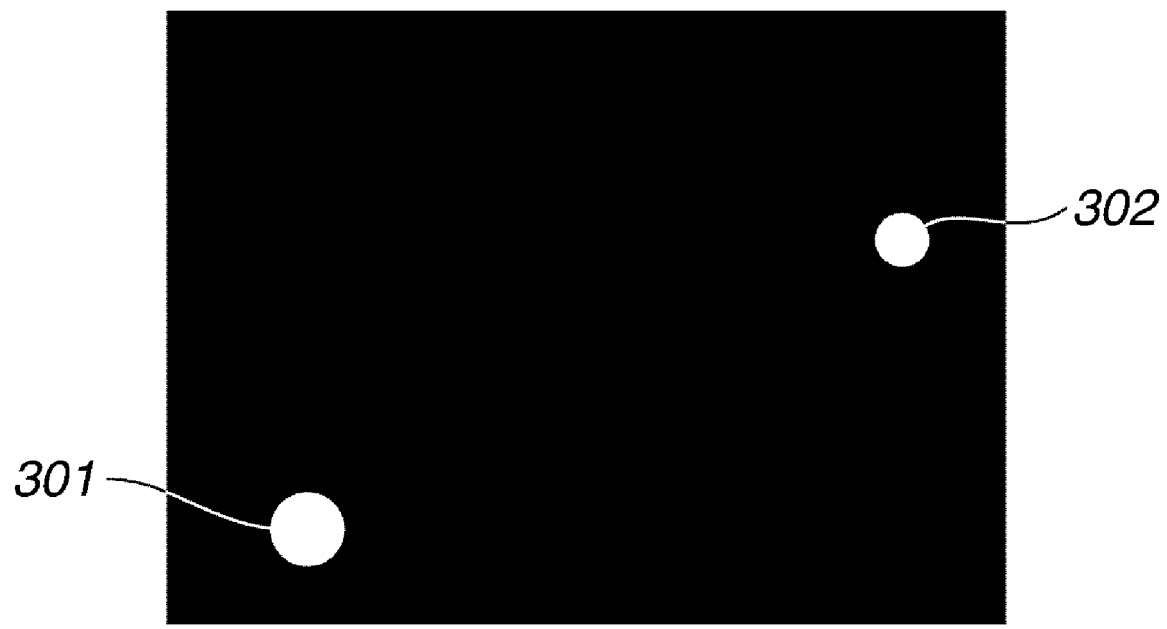
FIG. 11 is a view showing an image captured by an infrared camera shown in FIG. 10.

FIG. 8 is a block diagram illustrating an information processing apparatus according to the third exemplary embodiment. As shown in FIG. 8, the information processing apparatus 900 according to the third exemplary embodiment includes an outside-in camera 180, an image input section 160, a data storing section 170, an inside-out camera index detecting section 110, a position and orientation estimating section 920, an outside-in camera index candidate detecting section 140, a position constraint condition calculating section 150, an outside-in camera index identifying section 990, and an imaging apparatus including "inside-out" camera 930.

The sections denoted by the same reference numerals as those described in the first exemplary embodiment can function in the same manner and will not be described below in detail. The third exemplary embodiment is different from the first exemplary embodiment in that the image input section 160 can input an image captured by the inside-out camera 930 as an inside-out view image.

In the third exemplary embodiment, an outside-in camera index is provided on an object body 935.

The inside-out camera 930 is stationarily mounted on the object body 935. The object body 935 has a known position and orientation in an inside-out camera coordinate system.

Furthermore, an outside-in camera index P is provided on the object body 935. The position of the outside-in camera index P is known in an object body coordinate system.

The position and orientation estimating section 920 can input, from the data storing section 170, a combination of image coordinates $u^{Qkn}$ of each inside-out camera index detected by the inside-out camera index detecting section 110 and corresponding world coordinates $x_W^{Qkn}$ stored beforehand as known information. Then, the position and orientation estimating section 920 can estimate the position and orientation of the inside-out camera 930 based on the input information.

Furthermore, the position and orientation estimating section 920 can estimate the position and orientation of the object body 935 based on the above-described estimated position and orientation of the inside-out camera 930 (in the world coordinate system) and the position and orientation of the object body 935 known in the inside-out camera coordinate system.

The outside-in camera index identifying section 990 can identify an outside-in camera index based on the position and orientation of the object body 935 estimated by the position and orientation estimating section 920 and the position constraint condition of each outside-in camera index candidate calculated by the position constraint condition calculating section 150.

With the above-described arrangement, the information processing apparatus 900 can identify a true outside-in camera index provided on an arbitrary object body.

The position and orientation estimating section 920 according to the third exemplary embodiment obtains the position and orientation of the object body 935 after the position and orientation of the inside-out camera 930 is obtained. However, the position and orientation estimating section 920 can directly obtain the position and orientation of the object body 935.

The object body 935 according to the third exemplary embodiment can be an imaging apparatus that can capture a physical space. For example, the inside-out camera 930 faces upward to have a visual field different from that of the imaging apparatus that captures a physical space. The inside-out camera indices $Q_k$ can be disposed in the visual field of the inside-out camera 930. With this arrangement, the imaging apparatus can capture a physical space without spoiling the physical space image because the inside-out camera indices Qk can be removed from the visual field of the imaging apparatus.

Furthermore, in the third exemplary embodiment, plural inside-out cameras 930 can be mounted on the object body 935 so that each of the position and the orientation of the object body 935 can be accurately estimated.

Modified Embodiment 1

In the above-described exemplary embodiments, the imaging apparatus can incorporate an inertia sensor to estimate the position and orientation of the imaging apparatus, for example, according to Hirofumi FUJII, Seishi KANBARA, Hidehiko IWASA, Haruo TAKEMURA, and Naokazu YOKOYA: "Gyro sensor equipped stereo camera positioning method applicable to the augmented reality," The Institute of Electronics, Information, and Communication Engineers, Technical Report PRMU99-192 (Shingakugihou, vol. 99, no. 574, pp. 1-8).

In this case, on an inside-out view image obtained by an imaging apparatus, at least two inside-out camera indices must be always observed. In this case, compared to the method using only image information, the position and orientation of the imaging apparatus can be stably estimated.

Modified Embodiment 2

In the above-described exemplary embodiments, the inside-out camera or the outside-in camera can be a special camera capable of capturing any light other than the visible light. For example, when an outside-in camera index is capable of emitting or reflecting infrared light, the outside-in camera can be an infrared camera that can capture the infrared light emitted from the index. In this case, erroneous detection of inside-out camera indices can be surely prevented because the inside-out camera indices are not included in an outside-in view image captured by the outside-in camera.

On the contrary, when the inside-out camera indices are capable of emitting or reflecting infrared light, the inside-out camera can be an infrared camera that can capture the infrared light emitted from the indices. Furthermore, when the inside-out camera indices and the outside-in camera index are capable of emitting or reflecting infrared light, both the inside-out camera and the outside-in camera can be infrared cameras that can capture the infrared light emitted from these indices.

Furthermore, the camera capturing special light having a wavelength different from that of the visible light is not limited to an infrared camera and can be another type of camera which is, for example, capable of capturing ultraviolet light, or can be a camera that can simultaneously capture both visible light and non-visible light.

Modified Embodiment 3

In the above-described exemplary embodiments, the outside-in camera index identifying section identifies an index candidate as a true outside-in camera index if the distance from this candidate to the estimated position of the outside-in camera index is shorter than a predetermined value. However, the outside-in camera index identifying section can obtain a distance between each index candidate and the estimated position and identify a candidate having a minimum distance as a true outside-in camera index. Furthermore, the outside-in camera index identifying section can determine that there is no index candidate corresponding to the outside-in camera index when the minimum distance is greater than a threshold.

Modified Embodiment 4

In the above-described exemplary embodiments, the outside-in camera index identifying section identifies each index based on a distance between the estimated three-dimensional position of the outside-in camera index and the three-dimensional position of the index candidate. However, the outside-in camera index identifying section can use a two-dimensional distance on an outside-in view image to identify each index.

More specifically, the outside-in camera index identifying section 190 can input the position and orientation of the outside-in camera 180 in the world coordinate system from the data storing section 170, project an estimated position of the outside-in camera index onto an outside-in view image based on the input information, and obtain a two-dimensional distance between the image coordinates of the estimated position and the image coordinates of an index candidate to identify the index. In this case, the position constraint condition calculating section 150 can be omitted.

Modified Embodiment 5

The outside-in camera index identifying section 190, 690, or 990 in the above-described exemplary embodiments is arranged to output the image coordinates of the outside-in camera index to an external device via the interface 1009. However, the outside-in camera index identifying section can calculate the position and orientation of the imaging apparatus (or the object body) accurately based on image coordinates of the outside-in camera index and the image coordinates of the inside-out camera indices and can output the calculated position and orientation of the imaging apparatus (or object body) to an external device.

FIG. 12 is a flowchart showing processing performed by the CPU 1001 for calculating the position and orientation of the imaging apparatus 130 (or the object body 935). The processing is realized when the CPU 1001 executes a software program corresponding to the function of a position and orientation calculating section (not shown).

In step S12000, the position and orientation calculating section inputs image coordinates of the inside-out camera indices detected by the inside-out camera index detecting section 110, image coordinates of the outside-in camera index identified by the outside-in camera index identifying section 190, and parameters constraining the position of the outside-in camera index calculated by the position constraint condition calculating section 150.

The parameters constraining the position of the outside-in camera index are, for example, parameters representing three-dimensional straight lines if only one outside-in camera is used or three-dimensional position information if two or more outside-in cameras are used.

In step S12010, the position and orientation calculating section calculates the position and orientation of the imaging apparatus 130 (or the object body 935) that can minimize an error of the inside-out camera indices on an inside-out view image, under the constraint conditions of a position where the outside-in camera index should be present. More specifically, for example, a method discussed in Japanese Patent Application Laid-Open No. 2004-233334 can be used to calculate the position and orientation of the imaging apparatus 130 (or object body 935).

In step S12020, the position and orientation calculating section outputs information relating to the calculated position and orientation of the imaging apparatus 130 (or the object body 935), for example, in the form of a modeling conversion matrix.

Furthermore, without using the parameters constraining the position of the outside-in camera index, the position and orientation calculating section can calculate the position and orientation of the imaging apparatus 130 (or the object body 935) by performing calculations for minimizing the sum of errors between the image coordinates of the inside-out camera indices and the outside-in camera index and their calculation values. More specifically, for example, a method discussed in Japanese Patent Application Laid-Open No. 2004-233334 can be used.

Modified Embodiment 6

In the above-described exemplary embodiments, the position and orientation of the imaging apparatus 130 (or the object body 935) is first estimated and the outside-in camera index is identified based on the estimated values. However, the image coordinates of each outside-in camera index candidate and the image coordinates of inside-out camera indices can be used to calculate the position and orientation of the imaging apparatus 130 by using, for example, a method described in Japanese Patent Application Laid-Open No. 2004-233334, and an index candidate having the minimum residual errors in the calculation process can be identified as a true index. In this case, there is no need to estimate the position and orientation of the imaging apparatus 130 by using only the inside-out camera indices. In this case, the position and orientation estimating section 120 and the position constraint condition calculating section 150 can be omitted.

Modified Embodiment 7

In the above-described exemplary embodiments, each inside-out camera index can be discriminated in some way. However, similar to the outside-in camera indices, each inside-out camera index may not be discriminated. In this case, outside-in camera index can be identified as follows. First, the three-dimensional position of each outside-in camera index is assumed as the position of the imaging apparatus 130 (or the object body 935). Then, three-dimensional position of each inside-out camera index is projected onto the virtual sphere whose center is assumed to be the position of the imaging apparatus 130. And then, projected positions are matched with the inside-out camera index candidates by using, for example, the method described in H. Najafi, N. Navab, G. Klinker: "Automated Initialization for Marker-less Tracking: A Sensor Fusion Approach," Proc. of International Symposium on Mixed and Augmented Reality, pp. 79-88, 2004. Furthermore, the image coordinates of the inside-out camera index candidates, which are matched with projected positions, and the image coordinates of the outside-in camera index candidate, can be used to calculate the position and orientation of the imaging apparatus 130 by using, for example, the method described in Japanese Patent Application Laid-Open No. 2004-233334. Finally, the outside-in camera index candidate having the minimum residual errors in the calculation process can be identified as a true outside-in camera index.

Other Exemplary Embodiments

Furthermore, software program code for realizing the functions of the above-described exemplary embodiments can be supplied, via a storage medium (or a recording medium), to a system or an apparatus. A computer (or CPU or MPU) in the system or the apparatus can read the program code stored in the storage medium and can execute the readout program.

In this case, the program code read out from the storage medium can realize the functions of the exemplary embodiments. The equivalents of programs can be used if they possess comparable functions. Accordingly, when the functions or processes of the exemplary embodiments are realized by a computer, program code installed in the computer and a recording medium storing the program are used to implement the present invention.

In other words, the present invention encompasses a computer program that can realize the functions or processes of the exemplary embodiments or any recording medium that can store the program. In this case, the type of program can be selected from any one of object codes, interpreter programs, and OS script data. A recording medium supplying the program can be selected from any one of a flexible disk, a hard disk, an optical disk, a magneto-optical disk, an MO, a CD-ROM, a CD-R, a CD-RW, a magnetic tape, a nonvolatile memory card, a ROM, and a DVD (DVD-ROM, DVD-R).

The method for supplying the program includes accessing a home page on the Internet using the browsing function of a client computer, when the home page allows each user to download the computer program of the present invention, or compressed files of the programs having automatic installing functions, to a hard disk or other recording medium of the user.

Furthermore, the program code constituting the programs of the present invention can be divided into a plurality of files so that respective files are downloadable from different home pages. Namely, the present invention encompasses WWW servers that allow numerous users to download the program files so that the functions or processes of the present invention can be realized on their computers.

Furthermore, enciphering the programs of the present invention and storing the enciphered programs in a CD-ROM or comparable recording medium is a practical method when the programs of the present invention are distributed to the users. The authorized users (i.e., users satisfying predetermined conditions) are allowed to download key information from a home page on the Internet. The users can decipher the programs with the obtained key information and can install the programs on their computers. When the computer reads and executes the installed programs, the functions of the above-described exemplary embodiments can be realized.

Furthermore, not only the functions of the above-described exemplary embodiment can be realized by a computer that executes the programs, but also an operating system (OS) running on the computer can execute part or all of the actual processing based on instructions of the programs.

Furthermore, the program code read out of a storage medium can be written into a memory of a function expansion board equipped in a computer or into a memory of a function expansion unit connected to the computer. In this case, based on an instruction of the program, a CPU provided on the function expansion board or the function expansion unit can execute part or all of the processing so that the functions of the above-described exemplary embodiments can be realized.

When the present invention is applied to the above-described recording medium, the recording medium stores the program code corresponding to the above-described flowcharts.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2005-188296 filed Jun. 28, 2005, which is hereby incorporated by reference herein in its entirety.

What is claimed is:

1. An information processing method performed by an information processing apparatus including a processor, the information processing method comprising:
   a first image inputting step of inputting a first image captured by an imaging apparatus configured to capture a physical space;
   a second image inputting step of inputting a second image captured by an image capture unit configured to capture the imaging apparatus from an outside-in view position;
   a first detecting step, performed by the processor of detecting a feature quantity relating to image coordinates of a first index in the physical space, based on the first image input in the first image inputting step;
   a second detecting step of detecting a feature quantity relating to image coordinates of a candidate region relevant to a second index on the imaging apparatus, based on the second image input in the second image inputting step; and
   an identifying step, performed by the processor of identifying the candidate region as the second index, based on the feature quantity relating to the image coordinates of the first index detected in the first detecting step and the feature quantity relating to the image coordinates of the candidate region relevant to the second index.

2. The information processing method according to claim 1, further comprising:
   an index position estimating step of calculating an estimated position and orientation of the imaging apparatus based on the feature quantity relating to the image coordinates of the first index, and calculating an estimated position of the second index based on the estimated position and orientation; and
   a constraint condition calculating step of calculating a constraint condition relating to a position of the candidate region based on the feature quantity relating to the image coordinates of the candidate region relevant to the second index detected in the second detecting step.

3. The information processing method according to claim 2, wherein the constraint condition relating to the position of the candidate region relevant to the second index includes a straight line constraining the position of the candidate region, and
   wherein the identifying step includes a step of identifying the candidate region as the second index based on a distance between the estimated position of the second index and the straight line.

4. The information processing method according to claim 3, wherein the image capture unit includes a plurality of cameras,
   wherein the constraint condition relating to the position of the candidate region relevant to the second index includes a three-dimensional position, and
   wherein the identifying step includes a step of identifying the candidate region as the second index based on a distance between the estimated position of the second index and the three-dimensional position.

5. The information processing method according to claim 1, wherein the image capture unit is fixed in the physical space.

6. An information processing method performed by an information processing apparatus including a processor, the information processing method comprising:
   a first image inputting step of inputting a first image captured by an imaging apparatus mounted on an object body and configured to capture a physical space;
   a second image inputting step of inputting a second image captured by an image capture unit configured to capture the object body from an outside-in view position;
   a first detecting step, performed by the processor of detecting a feature quantity relating to image coordinates of a first index in the physical space, based on the first image input in the first image inputting step;
   a second detecting step of detecting a feature quantity relating to image coordinates of a candidate region relevant to a second index on the object body, based on the second image input in the second image inputting step; and
   an identifying step, performed by the processor of identifying the candidate region as the second index, based on the feature quantity relating to the image coordinates of the first index detected in the first detecting step and the feature quantity relating to the image coordinates of the candidate region relevant to the second index.

7. The information processing method according to claim 6, further comprising:
   an index position estimating step of calculating an estimated position and orientation of the imaging apparatus based on the feature quantity relating to the image coordinates of the first index, and calculating an estimated position of the second index based on the estimated position and orientation; and
   a constraint condition calculating step of calculating a constraint condition relating to a position of the candidate region based on the feature quantity relating to the image coordinates of the candidate region relevant to the second index detected in the second detecting step.

8. The information processing method according to claim 7, wherein the constraint condition relating to the position of the candidate region relevant to the second index includes a straight line constraining the position of the candidate region, and
   wherein the identifying step includes a step of identifying the candidate region as the second index based on a distance between the estimated position of the second index and the straight line.

9. The information processing method according to claim 6, wherein the image capture unit includes a plurality of cameras,
wherein the constraint condition relating to the position of the candidate region relevant to the second index includes a three-dimensional position, and
wherein the identifying step includes a step of identifying the candidate region as the second index based on a distance between the estimated position of the second index and the three-dimensional position.

10. The information processing method according to claim 6, wherein the image capture unit is fixed in the physical space.

11. A computer program stored in a computer-readable medium for causing a computer to execute an information processing method comprising:
a first image inputting step of inputting a first image captured by an imaging apparatus configured to capture a physical space;
a second image inputting step of inputting a second image captured by an image capture unit configured to capture the imaging apparatus from an outside-in view position;
a first detecting step of detecting a feature quantity relating to image coordinates of a first index in the physical space, based on the first image input in the first image inputting step;
a second detecting step of detecting a feature quantity relating to image coordinates of a candidate region relevant to a second index on the imaging apparatus, based on the second image input in the second image inputting step; and
an identifying step of identifying the candidate region as the second index, based on the feature quantity relating to the image coordinates of the first index detected in the first detecting step and the feature quantity relating to the image coordinates of the candidate region relevant to the second index.

12. A computer program stored in a computer-readable medium for causing a computer to execute an information processing method comprising:
a first image inputting step of inputting a first image captured by an imaging apparatus mounted on an object body and configured to capture a physical space;
a second image inputting step of inputting a second image captured by an image capture unit configured to capture the object body from an outside-in view position;
a first detecting step of detecting a feature quantity relating to image coordinates of a first index in the physical space, based on the first image input in the first image inputting step;
a second detecting step of detecting a feature quantity relating to image coordinates of a candidate region relevant to a second index on the object body, based on the second image input in the second image inputting step; and
an identifying step of identify the candidate region as the second index, based on the feature quantity relating to the image coordinates of the first index detected in the first detecting step and the feature quantity relating to the image coordinates of the candidate region relevant to the second index.

13. An information processing apparatus comprising:
a first image input unit arranged to input a first image captured by an imaging apparatus configured to capture a physical space;
a second image input unit arranged to input a second image captured by an image capture unit configured to capture the imaging apparatus from an outside-in view position;
a first detecting unit arranged to detect a feature quantity relating to image coordinates of a first index in the physical space, based on the first image input by the first image input unit;
a second detecting unit arranged to detect a feature quantity relating to image coordinates of a candidate region relevant to a second index on the imaging apparatus, based on the second image input by the second image input unit;
an identifying unit arranged to identify the candidate region as the second index, based on the feature quantity relating to the image coordinates of the first index and the feature quantity relating to the image coordinates of the candidate region relevant to the second index.

14. An information processing apparatus comprising:
a first image input unit arranged to input a first image captured by an imaging apparatus mounted on an object body and configured to capture a physical space;
a second image input unit arranged to input a second image captured by an image capture unit configured to capture the object body from an outside-in view position;
a first detecting unit arranged to detect a feature quantity relating to image coordinates of a first index in the physical space, based on the first image input by the first image input unit;
a second detecting unit arranged to detect a feature quantity relating to image coordinates of a candidate region relevant to a second index on the object body, based on the second image input by the second image input unit;
an identifying unit arranged to identify the candidate region as the second index, based on the feature quantity relating to the image coordinates of the first index and the feature quantity relating to the image coordinates of the candidate region relevant to the second index.

15. An information processing method performed by an information processing apparatus including a processor, the information processing method comprising:
a first image inputting step of inputting a first image captured by an imaging apparatus configured to capture a physical space;
a second image inputting step of inputting a second image captured by an image capture unit configured to capture the imaging apparatus from an outside-in view position;
a first detecting step, performed by the processor of detecting a feature quantity relating to image coordinates of a candidate region relevant to a first index in the physical space, based on the first image input in the first image inputting step;
a second detecting step of detecting a feature quantity relating to image coordinates of a candidate region relevant to a second index on the imaging apparatus, based on the second image input in the second image inputting step; and
an identifying step, performed by the processor of identifying the candidate region relevant to the second index, based on the feature quantity relating to the image coordinates of the candidate region relevant to the first index and the feature quantity relating to the image coordinates of the candidate region relevant to the second index.

16. An information processing apparatus comprising:
a first image input unit arranged to input first image captured by an imaging apparatus configured to capture a physical space;

a second image input unit arranged to input a second image captured by an image capture unit configured to capture the imaging apparatus from an outside-in view position;

a first detecting unit arranged to detect a feature quantity relating to image coordinates of a candidate region relevant to a first index in the physical space, based on the first image input in the first image inputting step;

a second detecting unit arranged to detect a feature quantity relating to image coordinates of a candidate region relevant to a second index on the imaging apparatus, based on the second image; and an identifying unit arranged to identify the candidate region relevant to the second index, based on the feature quantity relating to the image coordinates of the candidate region relevant to the first index and the feature quantity relating to the image coordinates of the candidate region relevant to the second index.

17. A computer program stored in a computer-readable medium for causing a computer to execute an information processing method comprising:

a first image inputting step of inputting a first image captured by an imaging apparatus configured to capture a physical space;

a second image inputting step of inputting a second image captured by an image capture unit configured to capture the imaging apparatus from an outside-in view position;

a first detecting step of detecting a feature quantity relating to image coordinates of a candidate region relevant to a first index in the physical space, based on the first image input in the first image inputting step;

a second detecting step of detecting a feature quantity relating to image coordinates of a candidate region relevant to a second index on the imaging apparatus, based on the second image input in the second image inputting step; and an identifying step of identifying the candidate region relevant to the second index, based on the feature quantity relating to the image coordinates of the candidate region relevant to the first index and the feature quantity relating to the image coordinates of the candidate region relevant to the second index.

* * * * *